United States Patent
Wu et al.

(10) Patent No.: US 11,866,622 B2
(45) Date of Patent: Jan. 9, 2024

(54) FLAME RETARDANT PRESSURE-SENSITIVE ADHESIVE, FLAME RETARDANT PRESSURE-SENSITIVE ADHESIVE SHEET AND METHOD FOR PREPARING SAME

(71) Applicant: 3M INNOVATIVE PROPERTIES COMPANY, St. Paul, MN (US)

(72) Inventors: Qing Wu, Shanghai (CN); Fan Gao, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 602 days.

(21) Appl. No.: 17/250,158

(22) PCT Filed: Jun. 10, 2019

(86) PCT No.: PCT/IB2019/054823
§ 371 (c)(1),
(2) Date: Dec. 7, 2020

(87) PCT Pub. No.: WO2019/239291
PCT Pub. Date: Dec. 19, 2019

(65) Prior Publication Data
US 2021/0253909 A1 Aug. 19, 2021

(30) Foreign Application Priority Data
Jun. 11, 2018 (CN) .......................... 201810599246.3

(51) Int. Cl.
| | |
|---|---|
| *C09J 7/25* | (2018.01) |
| *C09J 7/38* | (2018.01) |
| *C09J 133/02* | (2006.01) |
| *C09J 133/06* | (2006.01) |
| *C09J 133/08* | (2006.01) |
| *C09J 133/10* | (2006.01) |
| *C08K 5/51* | (2006.01) |
| *C08K 5/5399* | (2006.01) |
| *C09J 4/06* | (2006.01) |
| *C08K 5/523* | (2006.01) |

(52) U.S. Cl.
CPC .................. *C09J 7/25* (2018.01); *C08K 5/51* (2013.01); *C09J 4/06* (2013.01); *C09J 7/385* (2018.01); *C09J 133/02* (2013.01); *C09J 133/068* (2013.01); *C09J 133/08* (2013.01); *C09J 133/10* (2013.01); *C08K 5/523* (2013.01); *C08K 5/5399* (2013.01); *C09J 2301/122* (2020.08); *C09J 2301/302* (2020.08); *C09J 2433/00* (2013.01); *C09J 2479/086* (2013.01)

(58) Field of Classification Search
CPC .................. C08L 33/00–14; C09J 7/385; C09J 133/00–14; C09J 163/00–10; C09J 7/25; C08K 5/51
See application file for complete search history.

(56) References Cited

U.S. PATENT DOCUMENTS

| | | | |
|---|---|---|---|
| 6,291,627 B1 | 9/2001 | Wang | |
| 2004/0126574 A1 | 7/2004 | Kawaguchi | |
| 2004/0234753 A1 | 11/2004 | Husemann | |
| 2006/0234045 A1* | 10/2006 | Nakanishi | C09J 133/20 428/209 |
| 2007/0059521 A1 | 3/2007 | Nakamura | |
| 2009/0291291 A1 | 11/2009 | Epple | |
| 2013/0236718 A1 | 9/2013 | Buettner | |
| 2014/0004342 A1 | 1/2014 | Tojo | |
| 2014/0134414 A1 | 5/2014 | Ohata | |

FOREIGN PATENT DOCUMENTS

| | | |
|---|---|---|
| CN | 101805567 | 8/2010 |
| CN | 102695766 | 9/2012 |
| CN | 103304949 | 9/2013 |
| WO | WO 2008-087812 | 7/2008 |
| WO | WO 2011-111534 | 9/2011 |
| WO | WO 2014-047932 | 4/2014 |
| WO | WO 2016-109261 | 7/2016 |

OTHER PUBLICATIONS

International Search Report for PCT International Application No. PCT/IB2019/054823 dated Oct. 14, 2019, 5 pages.

* cited by examiner

*Primary Examiner* — Kregg T Brooks

(57) ABSTRACT

The present invention provides a flame-retardant pressure-sensitive adhesive, comprising reaction products of the following reaction compositions based a total weight of the reaction compositions as 100 wt. %: 35-99 wt. % of a (meth)acrylate copolymer containing a functional reactive functional group, the functional reactive functional group comprising one or a plurality of the following groups: carboxyl group, hydroxyl group and epoxy group; the (meth)acrylate copolymer containing the functional reactive functional group being formed by free radical polymerization of one or a plurality of monomers; and 1-65 wt. % of a reactive organophosphorus flame retardant capable of reacting with the functional reactive functional group, the reactive organophosphorus flame retardant being formed by reaction of reaction components comprising the following substances: a compound or oligomer containing n epoxy groups, wherein n>=2, and 9,10-dihydro-9-oxa-10-phosphaphenanthrene-10-oxide. The flame-retardant pressure-sensitive adhesive meets the halogen-free flame retardant requirements of the UL94V0 standard, and possesses high peel strength and high-temperature static shear strength.

12 Claims, No Drawings

FLAME RETARDANT PRESSURE-SENSITIVE ADHESIVE, FLAME RETARDANT PRESSURE-SENSITIVE ADHESIVE SHEET AND METHOD FOR PREPARING SAME

CROSS REFERENCE TO RELATED APPLICATIONS

This application is a national stage filing under 35 U.S.C. 371 of PCT/IB2019/054823, Jun. 10, 2019, which claims the benefit of Chinese Application No. 201810599246.3, filed Jun. 11, 2018, the disclosure of which is incorporated by reference in its/their entirety herein.

TECHNICAL FIELD

The present invention relates to the field of flame-retardant pressure-sensitive adhesives, and in particular to a flame-retardant pressure-sensitive adhesive, a flame-retardant pressure-sensitive adhesive sheet, and a method for preparing the same.

BACKGROUND

Polyacrylate pressure-sensitive adhesives are widely utilized because of numerous advantages: (1) strong coating compliance; fast drying speed; strong adhesion to substrate; good leveling and transparency; (2) good water resistance; exceptional performance of heat resistance, humidity resistance, and cold resistance; aging stability; and the ability to withstand weakly acidic and weakly alkaline solution, which is difficult to attain in an emulsion-type material; (3) performance adjustability: acrylate pressure-sensitive adhesives can be matched with a variety of resins.

Along with the issuance of "Requirements and Labels for Combustion Performance of Fire-retardant Products and Components in Public Places (GB 20286-2006)" as a national standard of the People's Republic of China, the relevant laws and regulations on fire-retardant products in public places have been enforced. However, polyacrylates, having an oxygen index of 0.182 (Source: CHM014L-Flame Retardant Chemicals: Technologies and Global Markets, BCC Research, Sep. 2013), belong to flammable materials, and thus the regulations prohibit them from being used widely indoors.

At present, flame-retardant acrylate pressure-sensitive adhesive tapes are usually prepared by adding a flame retardant in acrylate pressure-sensitive adhesives. Flame retardants are functional additives that can provide flammable polymers with flame retardant properties. These flame retardants are mainly designed for increasing flame retardance in polymer materials. Presently, the main flame retardants include organic flame retardants and inorganic flame retardants as well as halogen flame retardants (organic chlorides and organic bromides) and non-halogen flame retardants. Organic flame retardants are a type of flame retardant represented by bromine, phosphorus-nitrogen, nitrogen, red phosphorus and compounds. Inorganic flame retardants are mainly represented by flame retardant systems such as antimony trioxide, magnesium hydroxide, aluminum hydroxide, and silicon.

Halogen flame retardants are an important type of organic flame retardant and are among the earliest to be used as flame retardants. Because of halogen flame retardants' low cost, good stability, small addition amount, good compatibility with synthetic resin materials, and capability of maintaining the original physical and chemical properties of flame retardant products, they are the most produced and used organic flame retardant in the world at present. However, since the toxicity of halogen flame retardants endangers ecological safety, both Europe and the United States have introduced regulations to ban the use of some of the varieties. In contrast, most organophosphorus flame retardants have the advantages of low smoke emission, non-toxicity, low halogen, and halogen free. These properties accord with the development direction of flame retardants and possess good prospects for development. There are many kinds of organophosphorus flame retardants, which can be sub-divided, according to use methods, into additive flame retardants and reactive flame retardants. Chinese patent application No. CN201010123312.3 has disclosed a preparation method of a combined phosphorus type flame-retardant acrylate pressure-sensitive adhesive. The method is characterized in the following: the flame-retardant pressure-sensitive adhesive is prepared by using a commonly available, inexpensive, and environmentally-friendly flame retardant and flame retardant system; an intrinsic flame-retardant polymer pressure-sensitive adhesive is prepared by means of copolymerization and blending-compounding by introducing phosphate groups through phosphorus-containing acrylate monomers and conventional acrylate monomer solution tools to endow the acrylate pressure-sensitive adhesive with flame retardancy, and then a small amount of flame retardant is added to obtain the pressure-sensitive adhesive with excellent pressure sensitivity and flame retardancy. However, since the phosphorus-containing acrylate monomers employed do not have a tackifying effect, the peel strength of the most preferred embodiment of the phosphorus-containing acrylate monomers does not exceed 0.3 N/mm.

Chinese patent application No. CN102695766A has disclosed a flame-retardant adhesive composition, wherein the composition comprises a (meth)acrylate copolymer as component (A) and a flame retardant as component (B), the component (B) flame retardant contains aromatic phosphate ester; relative to 100 parts of component (A) (meth)acrylate copolymer by weight, the amount of the component (B) flame retardant is set to a value within a range of 70-200 parts by weight; as a monomer for copolymerizing the component (A) (meth)acrylate copolymer, it contains the following components (a)-(c): (a) (meth)alkyl acrylate containing an alkyl group with 1-12 carbon atoms: 100 parts by weight; (b) a vinyl compound containing a carboxyl group: 0 part by weight, or 0-1 part by weight excluding 0 part; and (c) a vinyl compound containing nitrogen: 1-70 parts by weight. However, according to the most preferred embodiment that satisfies flame retardancy grade UL94 VTM-0, the peel strength thereof does not exceed 0.5 N/mm.

US patent application No. US20070059521A1 has provided an adhesive sheet manufactured by using an adhesive containing no halogen flame retardants or aromatic phosphate flame retardants. The composition consists of (A) an acrylate copolymer; (B1) a non-aromatic phosphate flame retardant; and (B2) a nitrogen-containing phosphate flame retardant. The peel strength of the adhesive sheet can reach 0.32 N/mm when the grade UL94 VTM-0 is satisfied.

US patent application No. US20040234753A1 has disclosed a flame-retardant non-solvent pressure-sensitive adhesive comprising: (a) at least one acrylate adhesive component, (b) at least one ammonium polyphosphate component, and (c) at least one tackifying resin component. The peel strength of this type of adhesive sheet can reach 0.87 N/mm when the grade DIN40633, Z=1 (nonflammable) is satisfied (embodiment 1). However, the high-temperature (70° C.) static shear strength thereof is not mentioned.

SUMMARY

The purpose of the present invention is to provide a novel flame-retardant pressure-sensitive adhesive that meets the halogen-free flame retardant requirements of the UL94V0 standard, and that possesses higher peel strength and high-temperature static shear strength than pressure-sensitive adhesives not containing flame retardants.

According to one aspect of the present invention, the present invention provides a flame-retardant pressure-sensitive adhesive, comprising reaction products of the following reaction compositions: 1) 35-99 wt. % of a (meth)acrylate copolymer containing a functional reactive functional group, based a total weight of the reaction compositions as 100 wt. %; the functional reactive functional group comprising one or a plurality of the following groups: carboxyl group, hydroxyl group and epoxy group; the (meth)acrylate copolymer containing the functional reactive functional group being formed by free radical polymerization of one or a plurality of monomers comprising the following: a1) 86-99 wt. % of a (meth)alkyl acrylate, based on a total weight of the employed monomers as 100 wt. %, and a2) 1-14 wt. % of a monomer containing a functional reactive functional group, based on the total weight of the employed monomers as 100 wt. %; 2) 1-65 wt. % of a reactive organophosphorus flame retardant capable of reacting with the functional reactive functional group, based on a total weight of the pressure-sensitive adhesive as 100 wt. %; and the reactive organophosphorus flame retardant being formed by reaction of reaction components comprising the following substances: b1) a compound or oligomer containing n epoxy groups, the epoxy equivalent weight of the compound or oligomer being E, n>=2, and b2) 9,10-dihydro-9-oxa-10-phosphaphenanthrene-10-oxide, the relationship between the weight contents of b1 and b2 being as follows: $b2= (216*b1)/(nE(n-1))$, where E represents epoxy equivalent weight.

According to another aspect of the present invention, the present invention provides a flame-retardant pressure-sensitive adhesive sheet, comprising a substrate and the flame-retardant pressure-sensitive adhesive coating layer provided on the substrate, the flame-retardant pressure-sensitive adhesive coating layer comprising a coating layer obtained by drying and curing the flame-retardant pressure-sensitive adhesive.

According to another aspect of the present invention, the present invention provides a method for preparing the flame-retardant pressure-sensitive adhesive sheet, comprising the following steps: applying the flame-retardant pressure-sensitive adhesive to a substrate to form a wet flame-retardant pressure-sensitive adhesive liquid film on the surface of the substrate; drying and curing the wet flame-retardant pressure-sensitive adhesive liquid film to obtain a dry coating layer; and adhering the dry coating layer to the surface of the substrate.

The above-mentioned summary of the present invention is not intended to describe each disclosed embodiment of each implementation mode of the present invention. The following provides a more detailed description of the exemplary embodiments with reference to the drawings in combination with specific implementation modes. The detailed description can make the features and advantages of the above-mentioned and further embodiments of the present invention more obvious.

DETAILED DESCRIPTION

It is to be understood that, those of skill in the art can envisage other various embodiments according to teachings in this description and can make modifications thereto, without departing from the scope or spirit of the present invention. Therefore, the following particular embodiments have no limiting meaning.

Unless otherwise specified, all numbers used in this description and claims representing the characteristic sizes, quantities, and physical properties should be understood as being modified by the term "approximately" under any and all circumstances. Therefore, unless stated on the contrary, parameters in numerical values listed in the above description and in the attached claims are all approximate values, and those of skill in the art are capable of seeking to obtain desired properties by taking advantage of contents of the teachings disclosed herein, and changing these approximate values appropriately. A numerical range represented by end points includes all FIGURES within the range and any range within the range, for example, 1, 2, 3, 4 and 5 include 1, 1.1, 1.3, 1.5, 2, 2.75, 3, 3.80, 4, 5, and the like.

Flame-Retardant Pressure-Sensitive Adhesive

Additive flame retardants are added into polymers by using a mechanical mixing method, which provides polymers with flame retardancy properties. However, the compatibility between organophosphorus flame retardants and polyacrylate pressure sensitive adhesives is poor because organophosphorus flame retardants have much higher polarity than that of polyacrylate pressure sensitive adhesives. Therefore, the additive organophosphorus flame retardants will significantly reduce the peel strength of acrylate pressure-sensitive adhesives (solid powder additive type, such as EXOLIT OP 935, Clariant International Ltd. Pigments & Additives Division Business Unit Specialties Rothausstrasse 61, 4132 Muttenz, Switzerland) and high-temperature shear strength (liquid additive type, such as NCENDX P-30, Albemarle Chemical Co., Ltd., Rm. 2208, Rui'an Square, #333, Huaihai Middle Road, Shanghai). In addition, because of the poor compatibility between the additive organophosphorus flame retardants and polyacrylate pressure-sensitive adhesives, migration will occur during long-term storage or aging, resulting in poor stability. Reactive flame retardants are employed as a monomer to participate in the polymerization reaction, so the polymer itself contains flame-retardant components. The advantage of reactive flame retardants is that it has little influence on the use performance of polymer materials, is not easy to migrate, and has long-lasting flame retardancy. At present, there are few reactive organophosphorus flame retardants available in the market. Common reactive organophosphorus flame retardants such as EXOLIT OP 550 (Clariant International Ltd.) are developed for flame-retardant polyurethane. This type of reactive organophosphorus flame retardants cannot react with acrylate pressure-sensitive adhesives, and the compatibility with acrylate pressure-sensitive adhesives is very poor. Also, migration occurs during long-term storage or aging, such that the flame-retardant effect cannot be achieved. At present, there is no commercially available reactive organophosphorus flame retardant for acrylate pressure-sensitive adhesives.

The flame-retardant pressure-sensitive adhesive provided by the present invention forms dense pressure-sensitive coating layer on the surface of the substrate. The flame-retardant pressure-sensitive adhesive comprises reaction products of the following reaction compositions: 1) 35-99 wt. % of a (meth)acrylate copolymer containing a functional reactive functional group, based the total weight of the reaction compositions as 100 wt. %; the functional reactive functional group comprising one or a plurality of the following groups: carboxyl group, hydroxyl group and epoxy group, the (meth)acrylate copolymer containing the functional reactive functional group being formed by free radical polymerization of one or a plurality of monomers comprising the following; a1) 86-99 wt. % of a (meth)alkyl acrylate, based on the total weight of the employed monomers as 100 wt. %, and a2) 1-14 wt. % of a monomer containing a functional reactive functional group, based on the total weight of the employed monomers as 100 wt. %; 2) 1-65 wt. % of a reactive organophosphorus flame retardant capable of reacting with the functional reactive functional group, based on the total weight of the pressure-sensitive adhesive as 100 wt. %, and the reactive organophosphorus flame retardant being formed by reaction of reaction components comprising the following substances: b1) a compound or oligomer containing n epoxy groups, the epoxy equivalent weight of the compound or oligomer being E, n>=2, and b2) 9,10-dihydro-9-oxa-10-phosphaphenanthrene-10-oxide, the relationship between the weight contents of b1 and b2 being as follows: $b2 = (216*b1)/(nE(n-1))$.

The amount of the (meth)acrylate copolymer containing the functional reactive functional group is above 35 wt. %, 40 wt. %, 45 wt. %, 50 wt. %, 55 wt. % or 60 wt. %, and below 99 wt. %, 97 wt. % or 95 wt. %, 92 wt. %, 90 wt. %, 85 wt. %, 80 wt. %, 75 wt. % or 70 wt. %. The of the (meth)acrylate copolymer containing the functional reactive functional groups is 35-99 wt. %, preferably 40-90 wt. %, more preferably 45-85 wt. %, based the total weight amount of the reaction composition as 100 wt. %.

The (meth)alkyl acrylate comprises one or a plurality of the following components: (meth)methyl acrylate, ethyl (meth)acrylate, propyl (meth)acrylate, butyl (meth)acrylate, amyl (meth)acrylate, hexyl (meth)acrylate, heptyl (meth)acrylate, octyl (meth)acrylate, iso-octyl (meth)acrylate, and 2-ethylhexyl (meth)acrylate, and comprises possible isomer forms thereof; preferably, the (meth)alkyl acrylate comprises one or a plurality of the following: methyl (meth) acrylate, ethyl (meth)acrylate, n-propyl (meth)acrylate, iso-propyl (meth)acrylate, n-butyl (meth)acrylate, iso-butyl (meth)acrylate, and tert-butyl (meth)acrylate; and more preferably, the (meth)alkyl acrylate comprises one or a plurality of the following components: butyl (meth)acrylate, methyl (meth)acrylate, and iso-octyl (meth)acrylate. The amount of the a1) alkyl (meth)acrylate is 86-99 wt. %, preferably 90-97 wt. %, based on the total weight of the employed monomers as 100 wt. %.

The a2) monomer containing the functional reactive functional group comprises one or a plurality of the following components: a monomer containing a carboxyl group, a monomer containing a hydroxyl group, and a monomer containing an epoxy group. The monomer containing the carboxyl group comprises one or a plurality of the following acids: acrylic acid and methacrylic acid. The monomer containing the hydroxyl group comprises one or a plurality of the following components: hydroxyethyl (meth)acrylate, hydroxypropyl (meth)acrylate, and hydroxybutyl (meth) acrylate. The monomer containing the epoxy group comprises one or a plurality of the following components: glycidyl (meth)acrylate and 4-hydroxybutyl (meth)acrylate glycidyl ether. The amount of the monomer containing the functional reactive functional group is 1-14 wt. %, preferably 3-10 wt. %, based on the total weight of the employed monomers as 100 wt. %.

The reactive organophosphorus flame retardant can react with the functional reactive functional group. The amount of the reactive organophosphorus flame retardant is 1-65 wt. %, preferably 10-60 wt. %, more preferably 15-55 wt. %, based on the total weight of the pressure-sensitive adhesive as 100 wt. %. The equation of reaction between the b1) compound or oligomer containing n epoxy groups and the b2) 9,10-dihydro-9-oxa-10-phosphaphenanthrene-10-oxide is as illustrated in Reaction Scheme 1. The reaction can take place in the presence of catalysts (ethyl triphenyl phosphine acetate, ethyl triphenyl phosphine halide, benzyl trimethyl ammonium chloride, benzyl triethyl ammonium chloride, and tetrabutyl ammonium chloride). For specific reaction conditions, please refer to the U.S. Pat. No. 6,291,627B1. the amount of phosphorus in the reaction products of b1) and b2) is 4.5-14 wt. %, based on the total weight of the pressure-sensitive adhesive as 100 wt. %. This way, it ensures that the flame-retardant pressure-sensitive adhesives meet the flame retardancy standard of UL94V0, and possess high peel strength and high-temperature shear strength.

Reaction Scheme 1: Reaction between the epoxy compound and 9,10-dihydro-9-oxa-10-phosphaphenanthrene-10-oxide

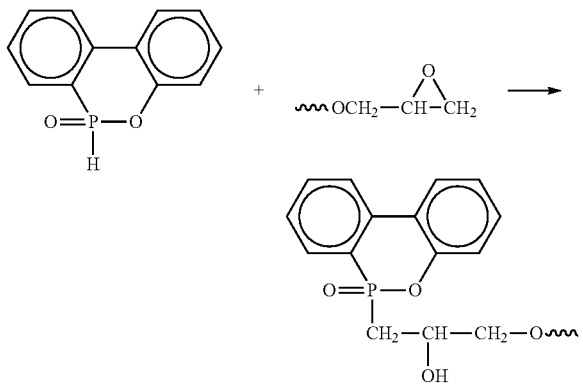

Reaction Scheme 1: Reaction Between the Epoxy Compound and 9,10-dihydro-9-oxa-10-phosphaphenanthrene-10-oxide The flame-retardant pressure-sensitive adhesive may further comprise a non-reactive organophosphorus flame retardant. The non-reactive organophosphorus flame retardant comprises one or a plurality of the following components: red phosphorus, triaryl phosphate, tetraphenyl resorcinol bis(diphenylphosphate) (RDP), trichloropropyl phosphate (TCPP), and ammonium polyphosphate (APP). The structural formula of the non-reactive organophosphorus flame retardant is as illustrated below. The amount of the non-reactive organophosphorus flame retardant is 0-35 wt. %, preferably 3-20 wt. %, based the total weight of the reaction compositions as 100 wt. %.

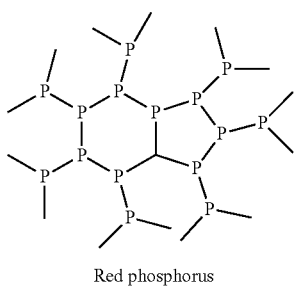

Red phosphorus

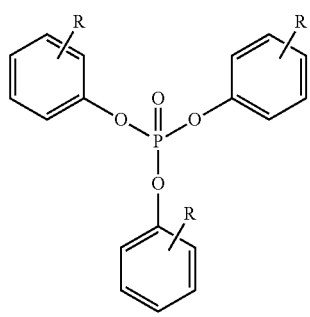

Triaryl phosphates

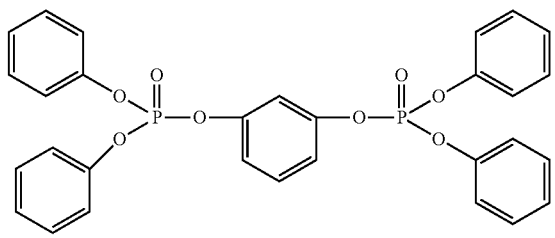

Resorcinyl diphosphoric acid tetraphenylester
(RDP)

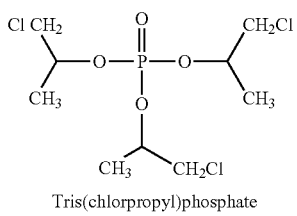

Tris(chlorpropyl)phosphate
(TCPP)

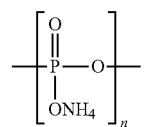

Ammonium polyphosphate
(APP)

The flame-retardant pressure-sensitive adhesive provided by the present invention may further comprise a cross-linking agent, which is not limited to a specific cross-linking agent. The cross-linking agent may be generally a polyaziridine compound, a polyepoxy compound, a polyisocyanate compound, or any other kind of cross-linking agents. The amount of the cross-linking agent is 0.001-3.0 wt. %, preferably 0.01-2.0 wt. %, and more preferably 0.1-1.0 wt. %. If the amount of the cross-linking agent is smaller than 0.001 wt. %, the high-temperature shear strength of the flame-retardant pressure-sensitive adhesive would not be enough; if the amount of the cross-linking agent is greater than 3.0 wt. %, the peeling strength of the flame-retardant pressure-sensitive adhesive may be reduced and may fail to meet the requirements.

Flame-Retardant Pressure-Sensitive Adhesive Sheet and Method for Preparing the Same The flame-retardant pressure-sensitive adhesive sheet provided by the present invention comprises a substrate and the flame-retardant pressure-sensitive adhesive coating layer provided on the substrate, the flame-retardant pressure-sensitive adhesive coating layer comprising a coating layer obtained by drying and curing the flame-retardant pressure-sensitive adhesive.

For details of the flame-retardant pressure-sensitive adhesive, see "*Flame-retardant pressure-sensitive adhesive*" in this description. The flame-retardant pressure-sensitive adhesive meets the halogen-free flame retardant requirements of the UL94V0 standard, and possesses high peel strength and high high-temperature static shear strength.

The method for preparing the flame-retardant pressure-sensitive adhesive sheet provided by the present invention comprises the following steps: applying the flame-retardant pressure-sensitive adhesive to a substrate to form a wet flame-retardant pressure-sensitive adhesive liquid film on the surface of the substrate; drying and curing the wet flame-retardant pressure-sensitive adhesive liquid film to obtain a dry coating layer; and adhering the dry coating layer to the surface of the substrate.

For details of the flame-retardant pressure-sensitive adhesive, see "*Flame-retardant pressure-sensitive adhesive*" in this description. The flame-retardant pressure-sensitive adhesive may be applied to the surface of the substrate by adopting any method known in the prior art, and the method may be preferably one or a plurality of the following methods: roller coating, flow coating, dip coating, spin coating, spray coating, scrape coating and die coating. The flame-retardant pressure-sensitive adhesive coating layer completely or partially does not contain solvent, and preferably completely does not contain solvent. The pressure-sensitive adhesive coating layer may have any thickness as required. For example, the thickness range may be 2-250, preferably 10-100 μm. The flame-retardant pressure-sensitive adhesive sheet may be dried and cured by using any suitable drying and curing method known in the prior art. The substrate coated with the flame-retardant pressure-sensitive adhesive is usually dried and cured at room temperature or higher temperatures (e.g., 20-200° C. or 80-120° C.).

Any suitable substrate can be used. The substrate may be made of plastic, such as polyethylene, polypropylene (including isotactic polypropylene), polystyrene, polyester, polyvinyl alcohol, poly(ethylene terephthalate), or poly(butylene terephthalate). It may also be a metalized plastic material, non-woven fabric, metalized non-woven fabric, metal foil, a composite film of metal foil and the above-mentioned plastic material, or foam, such as acrylic foam, polyethylene foam, polyurethane foam and chloroprene foam. The foam may be extruded together with the adhesive, or the adhesive may be attached to one or both sides of the foam.

The flame-retardant pressure-sensitive adhesive meets the halogen-free flame retardant requirements of the UL94V0 standard, and possesses high peel strength and high high-temperature static shear strength.

The present invention provides a plurality of preferred embodiments of the flame-retardant pressure-sensitive adhesive, the flame-retardant pressure-sensitive adhesive sheet, and the method for preparing the same.

Preferred embodiment 1 is a flame-retardant pressure-sensitive adhesive, comprising reaction products of the following reaction compositions:
1) 35-99 wt. % of (meth)acrylate copolymer containing a functional reactive functional group based a total weight of the reaction compositions as 100 wt. %, the functional reactive functional group comprising one or a plurality of the following groups: carboxyl group, hydroxyl group and epoxy group; the (meth)acrylate copolymer containing the functional reactive functional group being formed by free radical polymerization of one or a plurality of monomers comprising the following:
  a1) 86-99 wt. % of (meth)alkyl acrylate, based on a total weight of the employed monomers as 100 wt. %, and
  a2) 1-14 wt. % of monomer containing a functional reactive functional group, based on the total weight of the employed monomers as 100 wt. %;
2) 1-65 wt. % of a reactive organophosphorus flame retardant capable of reacting with the functional reactive functional group, based on a total weight of the pressure-sensitive adhesive as 100 wt. %; the reactive organophosphorus flame retardant being formed by reaction of reaction components comprising the following substances:
  b1) a compound or oligomer containing n epoxy groups, wherein an epoxy equivalent weight of the compound or oligomer is E, and n>=2, and
  b2) 9,10-dihydro-9-oxa-10-phosphaphenanthrene-10-oxide, the relationship between the weight contents of b1 and b2 being as follows: b2=(216*b1)/(nE(n−1)).

Preferred embodiment 2 is the flame-retardant pressure-sensitive adhesive of preferred embodiment 1. The (meth)alkyl acrylate comprises one or a plurality of the following components: methyl (meth)acrylate, ethyl (meth)acrylate, propyl (meth)acrylate, butyl (meth)acrylate, amyl (meth)acrylate, hexyl (meth)acrylate, heptyl (meth)acrylate, octyl (meth)acrylate, iso-octyl (meth)acrylate and 2-ethylhexyl (meth)acrylate.

Preferred embodiment 3 is the flame-retardant pressure-sensitive adhesive of preferred embodiment 1. The monomer containing the functional reactive functional group comprises one or a plurality of the following components: a monomer containing a carboxyl group, a monomer containing a hydroxyl group, and a monomer containing an epoxy group.

Preferred embodiment 4 is the flame-retardant pressure-sensitive adhesive of preferred embodiment 3. The monomer containing the carboxyl group comprises one or a plurality of the following acids: acrylic acid and methacrylic acid.

Preferred embodiment 5 is the flame-retardant pressure-sensitive adhesive of preferred embodiment 3. The monomer containing the hydroxyl group comprises one or a plurality of the following components: hydroxyethyl (meth)acrylate, hydroxypropyl (meth)acrylate, and hydroxybutyl (meth)acrylate.

Preferred embodiment 6 is the flame-retardant pressure-sensitive adhesive of preferred embodiment 3. The monomer containing the epoxy group comprises one or a plurality of the following components: glycidyl (meth)acrylate and 4-hydroxybutyl (meth)acrylate glycidyl ether.

Preferred embodiment 7 is the flame-retardant pressure-sensitive adhesive according to preferred embodiment 1. The flame-retardant pressure-sensitive adhesive comprises 0-35 wt. % of a non-reactive organophosphorus flame retardant, based the total weight of the reaction compositions as 100 wt. %; and the non-reactive organophosphorus flame retardant comprises one or a plurality of the following components: red phosphorus, triaryl phosphate, tetraphenyl resorcinol bis(diphenylphosphate) (RDP), trichloropropyl phosphate (TCPP), and ammonium polyphosphate (APP).

Preferred embodiment 8 is the flame-retardant pressure-sensitive adhesive of preferred embodiment 1. The flame-retardant pressure-sensitive adhesive comprises 0.001-3.0% wt. % of a cross-linking agent, based the total weight of the reaction compositions as 100 wt. %.

Preferred embodiment 9 is a flame-retardant pressure-sensitive adhesive sheet, comprising a substrate and the flame-retardant pressure-sensitive adhesive coating layer provided on the substrate, the flame-retardant pressure-sensitive adhesive coating layer comprising a coating layer obtained by drying and curing the flame-retardant pressure-sensitive adhesive according to any one of preferred embodiments 1-8.

Preferred embodiment 10 is the flame-retardant pressure-sensitive adhesive sheet of preferred embodiment 9. The substrate comprises one or a plurality of: a synthetic resin film, a rubber sheet, paper, fabric, a non-woven fabric, a foam sheet, a metal foil, and a laminated product of the substrate.

Preferred embodiment 11 is a method for preparing the flame-retardant pressure-sensitive adhesive sheet, comprising the following steps:
applying the flame-retardant pressure-sensitive adhesive according to any one of preferred embodiments 1-8 to a substrate to form a wet flame-retardant pressure-sensitive adhesive liquid film on the surface of the substrate; drying and curing the wet flame-retardant pressure-sensitive adhesive liquid film to obtain a dry coating layer; and adhering the dry coating layer to the surface of the substrate.

Preferred embodiment 12 is the method of preferred embodiment 11. The flame-retardant pressure-sensitive adhesive is applied to the surface of the substrate through the following methods: roller coating, flow coating, dip coating, spin coating, spray coating, scrape coating and die coating.

EXAMPLES

The purposes and advantages of the present disclosure will be further described by using the following non-restrictive embodiments. However, the specific materials and use amount described in these embodiments, as well as other conditions and details, should not be regarded as unduly limiting the present disclosure.

Raw materials employed in Examples and Comparative examples of the present invention are shown in the following Table 1.

TABLE 1

Raw materials used in Examples and Comparative Examples

| Product name | Description | Supplier |
|---|---|---|
| CHEMGUARD-DOPO | 9,10-dihydro-9-oxa-10-phosphaphenanthrene-10-oxide | Chembridge International Corp., Taipei, Taiwan, China |
| CNE resin NPCN-700 | o-cresol novolac epoxy resins, epoxy equivalent weight 195-204 g/eq, and softening point 52-57° C. | Nan Ya Plastics Industry Co., Ltd., Taipei, Taiwan, China |
| CNE resin NPCN-701 | o-cresol novolac epoxy resins, epoxy equivalent weight 190-215 g/eq, and softening point 60-64° C. | Nan Ya Plastics Industry Co., Ltd., Taipei, Taiwan, China |
| CNE resin NPCN-703 | o-cresol novolac epoxy resins, epoxy equivalent weight 195-220 g/eq, and softening point 75-85° C. | Nan Ya Plastics Industry Co., Ltd., Taipei, Taiwan, China |
| CNE resin NPCN-704 | o-cresol novolac epoxy resins, epoxy equivalent weight 200-220 g/eq, and softening point 85-95° C. | Nan Ya Plastics Industry Co., Ltd., Taipei, Taiwan, China |
| 2-EHA | 2-ethylhexyl acrylate | BASF (China) Ltd., Shanghai |
| BA | Butyl acrylate | BASF (China) Ltd., Shanghai |
| AA | Acrylic acid | BASF (China) Ltd., Shanghai |
| MAA | Methacrylic acid | BASF (China) Ltd., Shanghai |
| GMA | Glycidyl methacrylate | Mitsubishi Gas Chemical Company, Shanghai |
| VAZO-67 | 2,2'-azo-di-(2-methylbutyro-nitrile), free-radical thermal initiator (AMBN) | Dupont China Holding Co., Ltd., Shanghai |
| EA | Ethyl acetate solvent | BASF (China) Ltd., Shanghai |
| Cross-linking agent CX-100 | Polyaziridine compound liquid cross-linking agent | DSM NeoResins, USA |
| NCENDX P-30 | Bisphenol A bis-diphenylphosphate | Albemarle Chemical Co., Ltd., Shanghai |
| PI film | 25 μm polyimide film | Liyang Huajing Electronic Materials Co., Ltd., China |

(Meth)Acrylate Copolymer Containing Functional Reactive Functional Group

The (meth)acrylate copolymer containing the functional reactive functional group was synthesized by adopting the traditional solvent polymerization method. All raw materials were weighed according to the table below and put into a 500 ml flask with three necks. A pneumatic agitator (ZD-J-1, Shanghai Zuoda Painting Equipment Co., Ltd.) was used; purging with N2 was performed while the content was being stirred; the temperature of the content was raised to 60° C. for reaction for 24 hours; and after cooling, yellowish clarified viscous liquid (solid content 40% by weight) was obtained. This viscous liquid can be directly used in later tests without any further treatment. The formula for preparing the (meth)acrylate copolymer containing the functional reactive functional group in the present invention is shown in Table 2.

TABLE 2

(meth)acrylate copolymer containing functional reactive functional group

| S/N | Composition (g) | |
|---|---|---|
| CCB-7.5 | 2-EHA/BA/AA/EA/VAZO-67 | 42.5/42.5/15/149.8/0.2 |
| CCB-12.5 | 2-EHA/BA/AA/EA/VAZO-67 | 37.5/37.5/25/149.8/0.2 |
| CCB-3.5 | 2-EHA/BA/MAA/EA/VAZO-67 | 46.5/46.5/7/149.8/0.2 |
| CCB-10 | 2-EHA/BA/MAA/EA/VAZO-67 | 40/40/20/149.8/0.2 |
| ECB-3.5 | 2-EHA/BA/GMA/EA/VAZO-67 | 46.5/46.5/7/149.8/0.2 |
| ECB-10 | 2-EHA/BA/GMA/EA/VAZO-67 | 40/40/20/149.8/0.2 |

Synthesis of Reactive Organophosphorus Flame Retardant

For the method for synthesizing the reactive organophosphorus flame retardant, please refer to U.S. Pat. No. 6,291,627B1. CNE resin was weighed according to the table below and put into a 250 ml flask with three necks provided with a reflux device. A pneumatic agitator (ZD-J-1, Shanghai Zuoda Painting Equipment Co., Ltd.) was used; temperature of the content was raised to 110° C.; while the content was being stirred, purging with N2 was performed, for approximate 30 min, until the CNE resin was completely melted and the measured waster is completely removed. DOPO and ethyltriphenylphosphine acetate, accounting for 0.5% of total weight of all raw materials, were added as catalysts after the temperature of the content was raised to 130° C.; the content continued to be stirred agitation until DOPO was completely melted. The temperature of the content was gradually raised to 150° C. for reaction for 3 hours to obtain the reactive organophosphorus flame retardant. The reactive organophosphorus flame retardant (viscous liquid), while it is still hot, was poured into an aluminum pan coated with a mold-release agent. After cooling, a white translucent solid was obtained. After being crushed, the white translucent solid can be directly used in later tests without any further treatment. The formula for synthesizing the reactive organophosphorus flame retardant is shown in Table 3.

TABLE 3

Formula for synthesizing different reactive organophosphorus flame retardants

| Raw Materials | A-01 | A-02 | A-03 | A-04 | A-05 | A-06 | A-07 | A-08 | A-09 | A-10 | A-11 | A-12 |
|---|---|---|---|---|---|---|---|---|---|---|---|---|
| DOPO | 0 | 28.82 | 64.85 | 0 | 28.82 | 64.85 | 0 | 28.82 | 64.85 | 0 | 28.82 | 64.85 |
| NPCN-700 | 66.50 | 66.5 | 66.5 | | | | | | | | | |
| NPCN-701 | | | | 67.5 | 67.5 | 67.5 | | | | | | |
| NPCN-703 | | | | | | | 69.2 | 69.2 | 69.2 | | | |
| NPCN-704 | | | | | | | | | | 70.0 | 70.0 | 70.0 |
| Molecular weight | 540 | 832 | 907 | 1137 | 1785 | 2217 | 1402 | 2266 | 2914 | 1756 | 2836 | 3700 |

TABLE 4

Formula for flame-retardant pressure-sensitive adhesive

| Number | CCB-3.5 | CCB-7.5 | CCB-10 | CCB-12.5 | ECB-3.5 | ECB-10 | A-01 | A-02 | A-03 | A-04 | A-05 | A-06 | A-07 | A-08 | A-09 | A-10 | A-11 | A-12 | P30 | CX-100 |
|---|---|---|---|---|---|---|---|---|---|---|---|---|---|---|---|---|---|---|---|---|
| C01 | 15.0 | | | | | | | | | | | | | | | | | | | 0.006 |
| C02 | 15.0 | | | | | | 4.0 | | | | | | | | | | | | | 0.006 |
| C03 | 15.0 | | | | | | 2.0 | | | | | | | | | | | | 1.71 | 0.006 |
| C04 | 15.0 | | | | | | | | | | | | | | | | | | 3.41 | 0.006 |
| C05 | 15.0 | | | | | | | 4.0 | | | | | | | | | | | | 0.006 |
| C06 | 15.0 | | | | | | | 2.0 | | | | | | | | | | | 1.71 | 0.006 |
| C07 | 15.0 | | | | | | | | 4.0 | | | | | | | | | | | 0.006 |
| C08 | 15.0 | | | | | | | | 2.0 | | | | | | | | | | 1.71 | 0.006 |
| C09 | 15.0 | | | | | | | | | 4.0 | | | | | | | | | | 0.006 |
| C10 | 15.0 | | | | | | | | | 2.0 | | | | | | | | | 1.71 | 0.006 |
| C11 | 15.0 | | | | | | | | | | 4.0 | | | | | | | | | 0.006 |
| C12 | 15.0 | | | | | | | | | | 2.0 | | | | | | | | 1.71 | 0.006 |
| C13 | 15.0 | | | | | | | | | | | 4.0 | | | | | | | | 0.006 |
| C14 | 15.0 | | | | | | | | | | | 2.0 | | | | | | | 1.71 | 0.006 |
| C15 | 15.0 | | | | | | | | | | | | 4.0 | | | | | | | 0.006 |
| C16 | 15.0 | | | | | | | | | | | | 2.0 | | | | | | 1.71 | 0.006 |
| C17 | 15.0 | | | | | | | | | | | | | 4.0 | | | | | | 0.006 |
| C18 | 15.0 | | | | | | | | | | | | | 2.0 | | | | | 1.71 | 0.006 |
| C19 | 15.0 | | | | | | | | | | | | | | 4.0 | | | | | 0.006 |
| C20 | 15.0 | | | | | | | | | | | | | | 2.0 | | | | 1.71 | 0.006 |
| C21 | 15.0 | | | | | | | | | | | | | | | 4.0 | | | | 0.006 |
| C22 | 15.0 | | | | | | | | | | | | | | | 2.0 | | | 1.71 | 0.006 |
| C23 | 15.0 | | | | | | | | | | | | | | | | 4.0 | | | 0.006 |
| C24 | 15.0 | | | | | | | | | | | | | | | | 2.0 | | 1.71 | 0.006 |
| C25 | 15.0 | | | | | | | | | | | | | | | | | 4.0 | | 0.006 |
| C26 | 15.0 | | | | | | | | | | | | | | | | | 2.0 | 1.71 | 0.006 |
| C27 | | 15.0 | | | | | | | | | | | | | | | | | | 0.006 |
| C28 | | 15.0 | | | | | 4.0 | | | | | | | | | | | | | 0.006 |
| C29 | | 15.0 | | | | | 2.0 | | | | | | | | | | | | 1.71 | 0.006 |
| C30 | | 15.0 | | | | | | | | | | | | | | | | | 3.41 | 0.006 |
| C31 | | 15.0 | | | | | | 4.0 | | | | | | | | | | | | 0.006 |
| C32 | | 15.0 | | | | | | 2.0 | | | | | | | | | | | 1.71 | 0.006 |
| C33 | | 15.0 | | | | | | | 4.0 | | | | | | | | | | | 0.006 |
| C34 | | 15.0 | | | | | | | 2.0 | | | | | | | | | | 1.71 | 0.006 |
| C35 | | 15.0 | | | | | | | | 4.0 | | | | | | | | | | 0.006 |
| C36 | | 15.0 | | | | | | | | 2.0 | | | | | | | | | 1.71 | 0.006 |
| C37 | | 15.0 | | | | | | | | | 4.0 | | | | | | | | | 0.006 |
| C38 | | 15.0 | | | | | | | | | 2.0 | | | | | | | | 1.71 | 0.006 |
| C39 | | 15.0 | | | | | | | | | | 4.0 | | | | | | | | 0.006 |
| C40 | | 15.0 | | | | | | | | | | 2.0 | | | | | | | 1.71 | 0.006 |
| C41 | | 15.0 | | | | | | | | | | | 4.0 | | | | | | | 0.006 |
| C42 | | 15.0 | | | | | | | | | | | 2.0 | | | | | | 1.71 | 0.006 |
| C43 | | 15.0 | | | | | | | | | | | | 4.0 | | | | | | 0.006 |
| C44 | | 15.0 | | | | | | | | | | | | 2.0 | | | | | 1.71 | 0.006 |
| C45 | | 15.0 | | | | | | | | | | | | | 4.0 | | | | | 0.006 |
| C46 | | 15.0 | | | | | | | | | | | | | 2.0 | | | | 1.71 | 0.006 |
| C47 | | 15.0 | | | | | | | | | | | | | | 4.0 | | | | 0.006 |
| C48 | | 15.0 | | | | | | | | | | | | | | 2.0 | | | 1.71 | 0.006 |
| C49 | | 15.0 | | | | | | | | | | | | | | | 4.0 | | | 0.006 |
| C50 | | 15.0 | | | | | | | | | | | | | | | 2.0 | | 1.71 | 0.006 |
| C51 | | 15.0 | | | | | | | | | | | | | | | | 4.0 | | 0.006 |
| C52 | | 15.0 | | | | | | | | | | | | | | | | 2.0 | 1.71 | 0.006 |
| C53 | | | 15.0 | | | | | | | | | | | | | | | | | 0.006 |
| C54 | | | 15.0 | | | | 4.0 | | | | | | | | | | | | | 0.006 |
| C55 | | | 15.0 | | | | 2.0 | | | | | | | | | | | | 1.71 | 0.006 |
| C56 | | | 15.0 | | | | | | | | | | | | | | | | 3.41 | 0.006 |
| C57 | | | 15.0 | | | | | 4.0 | | | | | | | | | | | | 0.006 |
| C58 | | | 15.0 | | | | | 2.0 | | | | | | | | | | | 1.71 | 0.006 |
| C59 | | | 15.0 | | | | | | 4.0 | | | | | | | | | | | 0.006 |
| C60 | | | 15.0 | | | | | | 2.0 | | | | | | | | | | 1.71 | 0.006 |
| C61 | | | 15.0 | | | | | | | 4.0 | | | | | | | | | | 0.006 |
| C62 | | | 15.0 | | | | | | | 2.0 | | | | | | | | | 1.71 | 0.006 |
| C63 | | | 15.0 | | | | | | | | 4.0 | | | | | | | | | 0.006 |
| C64 | | | 15.0 | | | | | | | | 2.0 | | | | | | | | 1.71 | 0.006 |
| C65 | | | 15.0 | | | | | | | | | 4.0 | | | | | | | | 0.006 |
| C66 | | | 15.0 | | | | | | | | | 2.0 | | | | | | | 1.71 | 0.006 |
| C67 | | | 15.0 | | | | | | | | | | 4.0 | | | | | | | 0.006 |
| C68 | | | 15.0 | | | | | | | | | | 2.0 | | | | | | 1.71 | 0.006 |
| C69 | | | 15.0 | | | | | | | | | | | 4.0 | | | | | | 0.006 |
| C70 | | | 15.0 | | | | | | | | | | | 2.0 | | | | | 1.71 | 0.006 |
| C71 | | | 15.0 | | | | | | | | | | | | 4.0 | | | | | 0.006 |
| C72 | | | 15.0 | | | | | | | | | | | | 2.0 | | | | 1.71 | 0.006 |
| C73 | | | 15.0 | | | | | | | | | | | | | 4.0 | | | | 0.006 |
| C74 | | | 15.0 | | | | | | | | | | | | | 2.0 | | | 1.71 | 0.006 |
| C75 | | | 15.0 | | | | | | | | | | | | | | 4.0 | | | |

TABLE 4-continued

Formula for flame-retardant pressure-sensitive adhesive

| Number | CCB-3.5 | CCB-7.5 | CCB-10 | CCB-12.5 | ECB-3.5 | ECB-10 | A-01 | A-02 | A-03 | A-04 | A-05 | A-06 | A-07 | A-08 | A-09 | A-10 | A-11 | A-12 | P30 | CX-100 |
|---|---|---|---|---|---|---|---|---|---|---|---|---|---|---|---|---|---|---|---|---|
| C76 | | 15.0 | | | | | | | | | | | | | | | 2.0 | | 1.71 | 0.006 |
| C77 | | 15.0 | | | | | | | | | | | | | | | | 4.0 | | 0.006 |
| C78 | | 15.0 | | | | | | | | | | | | | | | | 2.0 | 1.71 | 0.006 |
| C79 | | | 15.0 | | | | | | | | | | | | | | | | | 0.006 |
| C80 | | | 15.0 | | | | 4.0 | | | | | | | | | | | | | 0.006 |
| C81 | | | 15.0 | | | | 2.0 | | | | | | | | | | | | 1.71 | 0.006 |
| C82 | | | 15.0 | | | | | | | | | | | | | | | | 3.41 | 0.006 |
| C83 | | | 15.0 | | | | | 4.0 | | | | | | | | | | | | 0.006 |
| C84 | | | 15.0 | | | | | 2.0 | | | | | | | | | | | 1.71 | 0.006 |
| C85 | | | 15.0 | | | | | | 4.0 | | | | | | | | | | | 0.006 |
| C86 | | | 15.0 | | | | | | 2.0 | | | | | | | | | | 1.71 | 0.006 |
| C87 | | | 15.0 | | | | | | | 4.0 | | | | | | | | | | 0.006 |
| C88 | | | 15.0 | | | | | | | 2.0 | | | | | | | | | 1.71 | 0.006 |
| C89 | | | 15.0 | | | | | | | | 4.0 | | | | | | | | | 0.006 |
| C90 | | | 15.0 | | | | | | | | 2.0 | | | | | | | | 1.71 | 0.006 |
| C91 | | | 15.0 | | | | | | | | | 4.0 | | | | | | | | 0.006 |
| C92 | | | 15.0 | | | | | | | | | 2.0 | | | | | | | 1.71 | 0.006 |
| C93 | | | 15.0 | | | | | | | | | | 4.0 | | | | | | | 0.006 |
| C94 | | | 15.0 | | | | | | | | | | 2.0 | | | | | | 1.71 | 0.006 |
| C95 | | | 15.0 | | | | | | | | | | | 4.0 | | | | | | 0.006 |
| C96 | | | 15.0 | | | | | | | | | | | 2.0 | | | | | 1.71 | 0.006 |
| C97 | | | 15.0 | | | | | | | | | | | | 4.0 | | | | | 0.006 |
| C98 | | | 15.0 | | | | | | | | | | | | 2.0 | | | | 1.71 | 0.006 |
| C99 | | | 15.0 | | | | | | | | | | | | | 4.0 | | | | 0.006 |
| C100 | | | 15.0 | | | | | | | | | | | | | 2.0 | | | 1.71 | 0.006 |
| C101 | | | 15.0 | | | | | | | | | | | | | | 4.0 | | | 0.006 |
| C102 | | | 15.0 | | | | | | | | | | | | | | 2.0 | | 1.71 | 0.006 |
| C103 | | | 15.0 | | | | | | | | | | | | | | | 4.0 | | 0.006 |
| C104 | | | 15.0 | | | | | | | | | | | | | | | 2.0 | 1.71 | 0.006 |
| C105 | | | | 15.0 | | | | | | | | | | | | | | | | |
| C106 | | | | 15.0 | | | 4.0 | | | | | | | | | | | | | |
| C107 | | | | 15.0 | | | 2.0 | | | | | | | | | | | | 1.71 | |
| C108 | | | | 15.0 | | | | | | | | | | | | | | | 3.41 | |
| C109 | | | | 15.0 | | | | 4.0 | | | | | | | | | | | | |
| C110 | | | | 15.0 | | | | 2.0 | | | | | | | | | | | 1.71 | |
| C111 | | | | 15.0 | | | | | 4.0 | | | | | | | | | | | |
| C112 | | | | 15.0 | | | | | 2.0 | | | | | | | | | | 1.71 | |
| C113 | | | | 15.0 | | | | | | 4.0 | | | | | | | | | | |
| C114 | | | | 15.0 | | | | | | 2.0 | | | | | | | | | 1.71 | |
| C115 | | | | 15.0 | | | | | | | 4.0 | | | | | | | | | |
| C116 | | | | 15.0 | | | | | | | 2.0 | | | | | | | | 1.71 | |
| C117 | | | | 15.0 | | | | | | | | 4.0 | | | | | | | | |
| C118 | | | | 15.0 | | | | | | | | 2.0 | | | | | | | 1.71 | |
| C119 | | | | 15.0 | | | | | | | | | 4.0 | | | | | | | |
| C120 | | | | 15.0 | | | | | | | | | 2.0 | | | | | | 1.71 | |
| C121 | | | | 15.0 | | | | | | | | | | 4.0 | | | | | | |
| C122 | | | | 15.0 | | | | | | | | | | 2.0 | | | | | 1.71 | |
| C123 | | | | 15.0 | | | | | | | | | | | 4.0 | | | | | |
| C124 | | | | 15.0 | | | | | | | | | | | 2.0 | | | | 1.71 | |
| C125 | | | | 15.0 | | | | | | | | | | | | 4.0 | | | | |
| C126 | | | | 15.0 | | | | | | | | | | | | 2.0 | | | 1.71 | |
| C127 | | | | 15.0 | | | | | | | | | | | | | 4.0 | | | |
| C128 | | | | 15.0 | | | | | | | | | | | | | 2.0 | | 1.71 | |
| C129 | | | | 15.0 | | | | | | | | | | | | | | 4.0 | | |
| C130 | | | | 15.0 | | | | | | | | | | | | | | 2.0 | 1.71 | |
| C131 | | | | | 15.0 | | | | | | | | | | | | | | | |
| C132 | | | | | 15.0 | | 4.0 | | | | | | | | | | | | | |
| C133 | | | | | 15.0 | | 2.0 | | | | | | | | | | | | 1.71 | |
| C134 | | | | | 15.0 | | | | | | | | | | | | | | 3.41 | |
| C135 | | | | | 15.0 | | | 4.0 | | | | | | | | | | | | |
| C136 | | | | | 15.0 | | | 2.0 | | | | | | | | | | | 1.71 | |
| C137 | | | | | 15.0 | | | | 4.0 | | | | | | | | | | | |
| C138 | | | | | 15.0 | | | | 2.0 | | | | | | | | | | 1.71 | |
| C139 | | | | | 15.0 | | | | | 4.0 | | | | | | | | | | |
| C140 | | | | | 15.0 | | | | | 2.0 | | | | | | | | | 1.71 | |
| C141 | | | | | 15.0 | | | | | | 4.0 | | | | | | | | | |
| C142 | | | | | 15.0 | | | | | | 2.0 | | | | | | | | 1.71 | |
| C143 | | | | | 15.0 | | | | | | | 4.0 | | | | | | | | |
| C144 | | | | | 15.0 | | | | | | | 2.0 | | | | | | | 1.71 | |
| C145 | | | | | 15.0 | | | | | | | | 4.0 | | | | | | | |
| C146 | | | | | 15.0 | | | | | | | | 2.0 | | | | | | 1.71 | |
| C147 | | | | | 15.0 | | | | | | | | | 4.0 | | | | | | |
| C148 | | | | | 15.0 | | | | | | | | | 2.0 | | | | | 1.71 | |
| C149 | | | | | 15.0 | | | | | | | | | | 4.0 | | | | | |
| C150 | | | | | 15.0 | | | | | | | | | | 2.0 | | | | 1.71 | |

TABLE 4-continued

Formula for flame-retardant pressure-sensitive adhesive

| Number | CCB-3.5 | CCB-7.5 | CCB-10 | CCB-12.5 | ECB-3.5 | ECB-10 | A-01 | A-02 | A-03 | A-04 | A-05 | A-06 | A-07 | A-08 | A-09 | A-10 | A-11 | A-12 | P30 | CX-100 |
|---|---|---|---|---|---|---|---|---|---|---|---|---|---|---|---|---|---|---|---|---|
| C151 | | | | | | 15.0 | | | | | | | | | | 4.0 | | | | |
| C152 | | | | | | 15.0 | | | | | | | | | | 2.0 | | | 1.71 | |
| C153 | | | | | | 15.0 | | | | | | | | | | | 4.0 | | | |
| C154 | | | | | | 15.0 | | | | | | | | | | | 2.0 | | 1.71 | |
| C155 | | | | | | 15.0 | | | | | | | | | | | | 4.0 | | |
| C156 | | | | | | 15.0 | | | | | | | | | | | | 2.0 | 1.71 | |

The present invention evaluates the peel strength of the flame-retardant pressure-sensitive adhesives provided in the embodiments and the comparative examples mainly by testing the 180-degree peel strength. The present invention further evaluates the static shear duration of the flame-retardant pressure-sensitive adhesive sheet provided in the embodiments and the comparative example by testing the 70° C. static shear duration. The present invention further evaluates the flame retardancy of the flame-retardant pressure-sensitive adhesive sheet provided in the embodiments and the comparative examples by using the flame retardancy standard of UL94.

Test of 180-Degree Peel Strength

The procedure to test 180-degree room-temperature peel strength is described in ASTM International Standard D3330. The test was completed on an Instron tension tester, at a peeling speed of 304.8 mm/min. The employed bonded substrate was a standard steel plate. The method for preparing a sample was that a 25.4 mm*200 mm adhesive tape sample was rolled back and forth once with a 1 kg rubber roll to be adhered to the surface of the steel plate. Next, the prepared sample was placed for 20 min under an environment with temperature of 23° C. and relative humidity of 60%, and then testing was performed. The number of samples representing the same property should not be less than five. The test results were expressed by the arithmetic average of peeling strength in unit of N/mm. The testing data is shown in Table 5.

Testing of High-Temperature (70° C.) Static Shear Duration

The testing procedure of 70° C. static shear duration is described in ASTM International Standard D3654. A 1 kg load was loaded below the testing sample, which was hung vertically in a 70° C. oven. The method for preparing a sample was that a 25.4 mm*25.4 mm adhesive tape sample was rolled back and forth once with a 1 kg rubber roll to be adhered to the surface of the steel plate which was previously cleaned by using isopropanol. The time recorded in the testing was the duration that the sample had not fallen off from the steel plate under the weight of the load. The number of samples representing the same property should not be less than five. The test results were expressed by the arithmetic average of peeling strength (in a case that the duration exceeded 10,000 min, it shall be recorded as 10,000 min) in unit of min. The test data is shown in Table 5.

Method for Evaluating Flame Retardancy

According to UL-94 (a standard developed by U.S. Underwriters' Laboratories Inc.) vertical combustion tests, the flame was placed under the sample for 10 seconds, and then removed; the time taken for the sample to stop burning was measured. Two groups of samples were evaluated; each group consisted of five samples (a total of 10 burning times were measured). The following were evaluated: the maximum among the 10 burning durations, the sum of the 10 burning durations, and whether droplets were present during burning. The classification of flame retardancy will be given below. Other details are in accordance with UL-94 standard.

V0: Maximum burning duration: 10 seconds or less; total burning duration: 50 seconds or less; no presence of droplets.

V1: Maximum burning duration: 30 seconds or less; total burning duration: 250 seconds or less; no presence of droplets.

V2: Maximum burning duration: 30 seconds or less; total burning duration: 250 seconds or less; presence of droplets.

Burning: the above-mentioned conditions are not satisfied.

Preparation of Flame-Retardant Pressure-Sensitive Adhesive and Flame-Retardant Pressure-Sensitive Adhesive Sheet (Embodiments C01-C156)

Each component of each formula in Table 4 was weighed and added into an independent 500 ml flask. A pneumatic agitator (ZD-J-1, Shanghai Zuoda Painting Equipment Co., Ltd.) was used to stir the content for 30 min to obtain the flame-retardant pressure-sensitive adhesive solution. After 20 minutes of standing to eliminate bubbles, the flame-retardant pressure-sensitive adhesive solution was coated on a 25 μm polyimide film by using a comma roll coater. The thickness of the coating was controlled to 50 μm (dry adhesive thickness). The flame-retardant pressure-sensitive adhesive was obtained by drying the solvent for 10 minutes at 105° C. in an oven.

Sample preparation: each prepared adhesive was coated on a substrate to form an adhesive film; next, the adhesive films were laminated to prepare specimens with a thickness of 1.0 mm, a width of 12.5 mm, and a length of 127 mm. The testing data is shown in Table 5.

TABLE 5

Testing results of 180-degree peel strength, high-temperature (70° C.) static shear duration, and flame retardancy grade according to the test samples

| S/N | 180° Peel (N/mm) | 70° C. shear (min) | Flame retardancy grade (UL94) |
|---|---|---|---|
| C01 | 0.45 | 10000+ | Burning |
| C02 | 0.43 | 311 | Burning |
| C03 | 0.56 | 88 | V2 |
| C04 | 0.70 | 7 | V1 |
| C05 | 0.55 | 10000+ | V1 |
| C06 | 0.62 | 3500 | V1 |
| C07 | 1.20 | 10000+ | V0 |
| C08 | 1.30 | 10000+ | V0 |
| C09 | 0.53 | 3618 | Burning |
| C10 | 0.62 | 690 | V2 |

TABLE 5-continued

Testing results of 180-degree peel strength, high-temperature (70° C.) static shear duration, and flame retardancy grade according to the test samples

| S/N | 180° Peel (N/mm) | 70° C. shear (min) | Flame retardancy grade (UL94) |
|---|---|---|---|
| C11 | 0.80 | 2800 | V1 |
| C12 | 0.85 | 887 | V1 |
| C13 | 1.40 | 10000+ | V0 |
| C14 | 1.69 | 9200 | V0 |
| C15 | 0.56 | 4777 | Burning |
| C16 | 0.62 | 1651 | V2 |
| C17 | 1.00 | 3700 | V1 |
| C18 | 1.06 | 2228 | V1 |
| C19 | 1.06 | 5432 | V1 |
| C20 | 1.20 | 880 | V1 |
| C21 | 0.43 | 9810 | Burning |
| C22 | 0.49 | 10000+ | V2 |
| C23 | 0.49 | 10000+ | V2 |
| C24 | 0.60 | 10000+ | V2 |
| C25 | 0.71 | 10000+ | V2 |
| C26 | 0.75 | 10000+ | V1 |
| C27 | 0.43 | 10000+ | Burning |
| C28 | 0.42 | 620 | Burning |
| C29 | 0.51 | 442 | V2 |
| C30 | 0.62 | 29 | V1 |
| C31 | 0.52 | 10000+ | V1 |
| C32 | 0.59 | 6711 | V1 |
| C33 | 1.16 | 10000+ | V0 |
| C34 | 1.25 | 10000+ | V0 |
| C35 | 0.51 | 6700 | Burning |
| C36 | 0.60 | 1788 | V2 |
| C37 | 0.77 | 5630 | V1 |
| C38 | 0.82 | 2300 | V1 |
| C39 | 1.36 | 10000+ | V0 |
| C40 | 1.62 | 10000+ | V0 |
| C41 | 0.54 | 7100 | Burning |
| C42 | 0.62 | 3600 | V2 |
| C43 | 0.97 | 6723 | V1 |
| C44 | 1.02 | 5611 | V1 |
| C45 | 1.01 | 7616 | V1 |
| C46 | 1.15 | 5200 | V1 |
| C47 | 0.38 | 10000+ | Burning |
| C48 | 0.42 | 10000+ | V2 |
| C49 | 0.49 | 10000+ | V2 |
| C50 | 0.56 | 10000+ | V2 |
| C51 | 0.66 | 10000+ | V2 |
| C52 | 0.72 | 10000+ | V1 |
| C53 | 0.36 | 10000+ | Burning |
| C54 | 0.31 | 1200 | Burning |
| C55 | 0.46 | 886 | V2 |
| C56 | 0.51 | 455 | V1 |
| C57 | 0.41 | 10000+ | V1 |
| C58 | 0.46 | 10000+ | V0 |
| C59 | 0.89 | 10000+ | V0 |
| C60 | 0.96 | 10000+ | V0 |
| C61 | 0.46 | 9200 | Burning |
| C62 | 0.50 | 3817 | V2 |
| C63 | 0.62 | 9918 | V1 |
| C64 | 0.71 | 4990 | V0 |
| C65 | 1.01 | 10000+ | V0 |
| C66 | 1.10 | 10000+ | V0 |
| C67 | 0.45 | 10000+ | Burning |
| C68 | 0.50 | 5998 | V2 |
| C69 | 0.81 | 10000+ | V1 |
| C70 | 0.83 | 8002 | V1 |
| C71 | 0.81 | 10000+ | V1 |
| C72 | 1.03 | 10000+ | V0 |
| C73 | 0.19 | 10000+ | Burning |
| C74 | 0.20 | 10000+ | V2 |
| C75 | 0.23 | 10000+ | V2 |
| C76 | 0.29 | 10000+ | V2 |
| C77 | 0.40 | 10000+ | V1 |
| C78 | 0.56 | 10000+ | V1 |
| C79 | 0.10 | 10000+ | Burning |
| C80 | 0.07 | 10000+ | Burning |
| C81 | 0.12 | 10000+ | V2 |
| C82 | 0.14 | 3210 | V0 |
| C83 | 0.12 | 10000+ | V0 |
| C84 | 0.12 | 10000+ | V0 |
| C85 | 0.23 | 10000+ | V0 |
| C86 | 0.26 | 10000+ | V0 |
| C87 | 0.12 | 10000+ | Burning |
| C88 | 0.13 | 10000+ | V2 |
| C89 | 0.15 | 10000+ | V0 |
| C90 | 0.18 | 10000+ | V0 |
| C91 | 0.23 | 10000+ | V0 |
| C92 | 0.26 | 10000+ | V0 |
| C93 | 0.12 | 10000+ | Burning |
| C94 | 0.12 | 10000+ | V2 |
| C95 | 0.19 | 10000+ | V1 |
| C96 | 0.21 | 10000+ | V0 |
| C97 | 0.20 | 10000+ | V0 |
| C98 | 0.22 | 10000+ | V0 |
| C99 | 0.03 | 10000+ | Burning |
| C100 | 0.03 | 10000+ | V2 |
| C101 | 0.03 | 10000+ | V2 |
| C102 | 0.06 | 10000+ | V1 |
| C103 | 0.10 | 10000+ | V0 |
| C104 | 0.12 | 10000+ | V0 |
| C105 | 0.36 | 7320 | Burning |
| C106 | 0.33 | 105 | Burning |
| C107 | 0.41 | 7 | Burning |
| C108 | 0.59 | 1 | V2 |
| C109 | 0.40 | 8311 | V2 |
| C110 | 0.42 | 570 | V1 |
| C111 | 0.73 | 5210 | V1 |
| C112 | 0.76 | 6500 | V1 |
| C113 | 0.40 | 1804 | Burning |
| C114 | 0.44 | 170 | Burning |
| C115 | 0.51 | 1007 | V2 |
| C116 | 0.53 | 200 | V2 |
| C117 | 0.80 | 10000+ | V1 |
| C118 | 0.86 | 7300 | V0 |
| C119 | 0.43 | 1570 | Burning |
| C120 | 0.46 | 890 | Burning |
| C121 | 0.55 | 1607 | V2 |
| C122 | 0.58 | 986 | V2 |
| C123 | 0.58 | 1010 | V1 |
| C124 | 0.64 | 98 | V0 |
| C125 | 0.36 | 4670 | Burning |
| C126 | 0.38 | 5730 | Burning |
| C127 | 0.38 | 9988 | V2 |
| C128 | 0.47 | 10000+ | V2 |
| C129 | 0.52 | 10000+ | V2 |
| C130 | 0.54 | 10000+ | V1 |
| C131 | 0.31 | 10000+ | Burning |
| C132 | 0.28 | 1020 | Burning |
| C133 | 0.37 | 79 | Burning |
| C134 | 0.50 | 3 | V2 |
| C135 | 0.34 | 10000+ | V2 |
| C136 | 0.37 | 1222 | V1 |
| C137 | 0.66 | 7800 | V1 |
| C138 | 0.70 | 10000+ | V1 |
| C139 | 0.33 | 3656 | Burning |
| C140 | 0.37 | 1880 | Burning |
| C141 | 0.46 | 2980 | V2 |
| C142 | 0.47 | 1200 | V2 |
| C143 | 0.70 | 10000+ | V1 |
| C144 | 0.76 | 10000+ | V0 |
| C145 | 0.33 | 4570 | Burning |
| C146 | 0.33 | 1876 | Burning |
| C147 | 0.49 | 5609 | V2 |
| C148 | 0.50 | 3232 | V2 |
| C149 | 0.51 | 4600 | V1 |
| C150 | 0.57 | 1778 | V0 |
| C151 | 0.30 | 9873 | Burning |
| C152 | 0.31 | 10000+ | Burning |
| C153 | 0.32 | 10000+ | V2 |
| C154 | 0.40 | 10000+ | V2 |

TABLE 5-continued

Testing results of 180-degree peel strength, high-temperature (70° C.) static shear duration, and flame retardancy grade according to the test samples

| S/N | 180° Peel (N/mm) | 70° C. shear (min) | Flame retardancy grade (UL94) |
|---|---|---|---|
| C155 | 0.47 | 10000+ | V2 |
| C156 | 0.47 | 10000+ | V1 |

Table 5 shows that, when the amount of the monomer containing the functional reactive functional group in the (meth)acrylate copolymer containing the functional reactive functional group is within 1%-14%, the peel strength and high-temperature static shear resistance can reach an optimal balance (an amount too low will lead to insufficient high-temperature static shear resistance; an amount too high will lead to lower peel strength). Moreover, a high amount of the monomer containing the functional reactive functional group facilitates the improvement of flame retardancy.

Table 5 shows that the peel strength, high-temperature static shear resistance, and flame retardancy reach an optimum balance when the amount of the reactive organophosphorus flame retardant capable of reacting with the reactive functional group is within 1%-65%. If the amount of the reactive organophosphorus flame retardant is too low, even though the high-temperature static shear resistance is high, the peel strength is low and results in a lack of flame-retardancy. Peel strength and flame retardancy increase with an increase in amount of the reactive organophosphorus flame retardant, while the high-temperature static shear resistance decreases accordingly. Moreover, the optimum molecular weight of the reactive organophosphorus flame retardant capable of reacting with the reactive functional group is within 800-2400. If the molecular weight of the reactive organophosphorus flame retardant is too low, the peel strength is high, while the high-temperature static shear resistance decreases. If the molecular weight of the reactive organophosphorus flame retardant is too high, the peel strength decreases, while the high-temperature static shear resistance increases.

Although the above particular embodiments comprise a great many concrete details for the purpose of illustration through examples, it is to be understood by those of ordinary skill in the art that many variations, modifications, replacements and changes to these details shall all fall within the scope of the present invention as claimed in the claims. Therefore, the disclosure as described in the particular embodiments does not pose any limitation to the present invention as claimed in the claims. The proper scope of the present invention should be defined by the claims and proper legal equivalents thereof. All references referred to are incorporated herein by reference in their entities.

The invention claimed is:

1. A flame-retardant pressure-sensitive adhesive, comprising reaction products of the following reaction compositions:
   1) 35-99 wt. % of a (meth)acrylate copolymer containing a functional reactive functional group, based a total weight of the reaction compositions as 100 wt. %; the functional reactive functional group comprising one or a plurality of the following groups: carboxyl group, hydroxyl group, and epoxy group; the (meth)acrylate copolymer containing the functional reactive functional group being formed by free radical polymerization of one or a plurality of monomers comprising the following:
      a1) 86-99 wt. % of a (meth)alkyl acrylate, based on a total weight of the employed monomers as 100 wt. %, and
      a2) 1-14 wt. % of a monomer containing a functional reactive functional group, based on the total weight of the employed monomers as 100 wt. %;
   2) 1-65 wt. % of a reactive organophosphorus flame retardant capable of reacting with the functional reactive functional group, based on a total weight of the pressure-sensitive adhesive as 100 wt. %; the molecular weight of the reactive organophosphorus flame retardant being 800-2400; and the reactive organophosphorus flame retardant being formed by reaction of reaction components comprising the following substances:
      b1) a compound or oligomer containing n epoxy groups, wherein an epoxy equivalent weight of the compound or oligomer is E, and n>=2, and
      b2) 9,10-dihydro-9-oxa-10-phosphaphenanthrene-10-oxide, the relationship between the weight contents of b1 and b2 being as follows: $b2=(216*b1)/(nE(n-1))$.

2. The flame-retardant pressure-sensitive adhesive according to claim 1, wherein the (meth)alkyl acrylate comprises one or a plurality of the following components: methyl (meth)acrylate, ethyl (meth)acrylate, propyl (meth)acrylate, butyl (meth)acrylate, amyl (meth)acrylate, hexyl (meth)acrylate, heptyl (meth)acrylate, octyl (meth)acrylate, iso-octyl (meth)acrylate, and 2-ethylhexyl (meth)acrylate.

3. The flame-retardant pressure-sensitive adhesive according to claim 1, wherein the monomer containing the functional reactive functional group comprises one or a plurality of the following components: a monomer containing a carboxyl group, a monomer containing a hydroxyl group, and a monomer containing an epoxy group.

4. The flame-retardant pressure-sensitive adhesive according to claim 3, wherein the monomer containing the carboxyl group comprises one or a plurality of the following acids: acrylic acid and methacrylic acid.

5. The flame-retardant pressure-sensitive adhesive according to claim 3, wherein the monomer containing the hydroxyl group comprises one or a plurality of the following components: hydroxyethyl (meth)acrylate, hydroxypropyl (meth)acrylate, and hydroxybutyl (meth)acrylate.

6. The flame-retardant pressure-sensitive adhesive according to claim 3, wherein the monomer containing the epoxy group comprises one or a plurality of the following components: glycidyl (meth)acrylate and 4-hydroxybutyl (meth)acrylate glycidyl ether.

7. The flame-retardant pressure-sensitive adhesive according to claim 1, wherein the flame-retardant pressure-sensitive adhesive comprises 0-35 wt. % of a non-reactive organophosphorus flame retardant, based the total weight of the reaction compositions as 100 wt. %; and the non-reactive organophosphorus flame retardant comprises one or a plurality of the following components: red phosphorus, triaryl phosphate, tetraphenyl resorcinol bis(diphenylphosphate) (RDP), trichloropropyl phosphate (TCPP), and ammonium polyphosphate (APP).

8. The flame-retardant pressure-sensitive adhesive according to claim 1, wherein the flame-retardant pressure-sensitive adhesive comprises 0.001-3.0% wt. % of a cross-linking agent, based on the total weight of the reaction compositions as 100 wt. %.

9. A flame-retardant pressure-sensitive adhesive sheet, comprising a substrate and the flame-retardant pressure-sensitive adhesive coating layer provided on the substrate, the flame-retardant pressure-sensitive adhesive coating layer comprising a coating layer obtained by drying and curing the flame-retardant pressure-sensitive adhesive according to claim 1.

10. The flame-retardant pressure-sensitive adhesive sheet according to claim 9, wherein the substrate comprises one or a plurality of: a synthetic resin film, a rubber sheet, paper, fabric, a non-woven fabric, a foam sheet, a metal foil, and a laminated product of the substrate.

11. A method for preparing a flame-retardant pressure-sensitive adhesive sheet, comprising the following steps:
applying the flame-retardant pressure-sensitive adhesive, according to claim 1, to a substrate to form a wet flame-retardant pressure-sensitive adhesive liquid film on a surface of the substrate; drying and curing the wet flame-retardant pressure-sensitive adhesive liquid film to obtain a dry coating layer; and adhering the dry coating layer to the surface of the substrate.

12. The method according to claim 11, wherein the flame-retardant pressure-sensitive adhesive is applied to the surface of the substrate through the following methods: roller coating, flow coating, dip coating, spin coating, spray coating, scrape coating, and die coating.

* * * * *

UNITED STATES PATENT AND TRADEMARK OFFICE
CERTIFICATE OF CORRECTION

PATENT NO. : 11,866,622 B2  
APPLICATION NO. : 17/250158  
DATED : January 9, 2024  
INVENTOR(S) : Alvin Wu et al.

Page 1 of 1

It is certified that error appears in the above-identified patent and that said Letters Patent is hereby corrected as shown below:

In the Claims

<u>Column 21</u>
Line 62, In Claim 1, delete "based a total" and insert -- based on a total --, therefor.

Signed and Sealed this
Twenty-seventh Day of August, 2024

Katherine Kelly Vidal
*Director of the United States Patent and Trademark Office*